(12) United States Patent
Pleune et al.

(10) Patent No.: US 11,798,296 B2
(45) Date of Patent: Oct. 24, 2023

(54) METHOD AND SYSTEM FOR SEATBELT DETECTION USING ADAPTIVE HISTOGRAM NORMALIZATION

(71) Applicant: VEONEER US, INC., Southfield, MI (US)

(72) Inventors: Mitchell Pleune, Southfield, MI (US); Caroline Chung, Southfield, MI (US); Afrah Naik, Southfield, MI (US)

(73) Assignee: VEONEER US, LLC, Southfield, MI (US)

( * ) Notice: Subject to any disclaimer, the term of this patent is extended or adjusted under 35 U.S.C. 154(b) by 141 days.

(21) Appl. No.: 17/557,370

(22) Filed: Dec. 21, 2021

(65) Prior Publication Data

US 2023/0196798 A1    Jun. 22, 2023

(51) Int. Cl.
| | |
|---|---|
| *G06V 20/59* | (2022.01) |
| *G06V 10/60* | (2022.01) |
| *G06V 40/10* | (2022.01) |
| *G06T 7/70* | (2017.01) |
| *G06T 5/40* | (2006.01) |

(52) U.S. Cl.
CPC .............. *G06V 20/593* (2022.01); *G06T 5/40* (2013.01); *G06T 7/70* (2017.01); *G06V 10/60* (2022.01); *G06V 40/103* (2022.01); *G06T 2207/10048* (2013.01); *G06T 2207/30268* (2013.01)

(58) Field of Classification Search
CPC .... G06V 20/593; G06V 10/60; G06V 40/103; G06T 5/40; G06T 7/70; G06T 2207/10048; G06T 2207/30268
See application file for complete search history.

(56) References Cited

U.S. PATENT DOCUMENTS

| | | | |
|---|---|---|---|
| 9,881,349 B1 | 1/2018 | Meier et al. | |
| 10,773,683 B1 * | 9/2020 | Ghannam | ............... B60R 22/48 |
| 10,864,826 B2 | 12/2020 | Kuepper et al. | |
| 2007/0195990 A1 | 8/2007 | Levy | |
| 2017/0289405 A1 * | 10/2017 | Agrawal | ............... H04N 1/6005 |
| 2018/0211123 A1 | 7/2018 | Yasuda et al. | |
| 2018/0326944 A1 * | 11/2018 | Cech | ....................... G01S 11/00 |

(Continued)

FOREIGN PATENT DOCUMENTS

WO    WO-2020139355 A1 *   7/2020   ......... G01C 21/3602

*Primary Examiner* — Nizar N Sivji
(74) *Attorney, Agent, or Firm* — DICKINSON WRIGHT PLLC

(57) ABSTRACT

A method for detecting seatbelt positioning comprises: capturing, by a camera, a source image including a plurality of pixels each having a corresponding brightness level; determining a range of brightness levels of a group of the plurality of pixels located within at least one region of the source image; generating an adjusted image by adjusting the corresponding brightness levels of the group of the pixels located within the region of the source image based on the range of the brightness levels of the group of the plurality of pixels located within the at least one region of the source image; converting the adjusted image to a black-and-white image; and scanning across the black-and-white image to detect a plurality of transitions between black and white segments corresponding to a predetermined pattern of the seatbelt, and using detections of the plurality of transitions to indicate a detection of the seatbelt.

20 Claims, 7 Drawing Sheets

(56) References Cited

U.S. PATENT DOCUMENTS

| | | | |
|---|---|---|---|
| 2019/0225186 A1* | 7/2019 | Szawarski | G06V 20/597 |
| 2020/0055480 A1 | 2/2020 | Herbert et al. | |
| 2020/0098128 A1* | 3/2020 | Fujii | G06T 7/60 |
| 2021/0206344 A1* | 7/2021 | George | B60R 21/01534 |
| 2022/0203925 A1* | 6/2022 | Ramaglia | G06V 20/59 |
| 2022/0398404 A1* | 12/2022 | Chung | B60R 22/48 |
| 2023/0020385 A1* | 1/2023 | Zeng | G06V 40/162 |
| 2023/0026640 A1* | 1/2023 | Thomas | B60R 11/04 |
| 2023/0043536 A1* | 2/2023 | Herman | G06T 15/506 |

\* cited by examiner

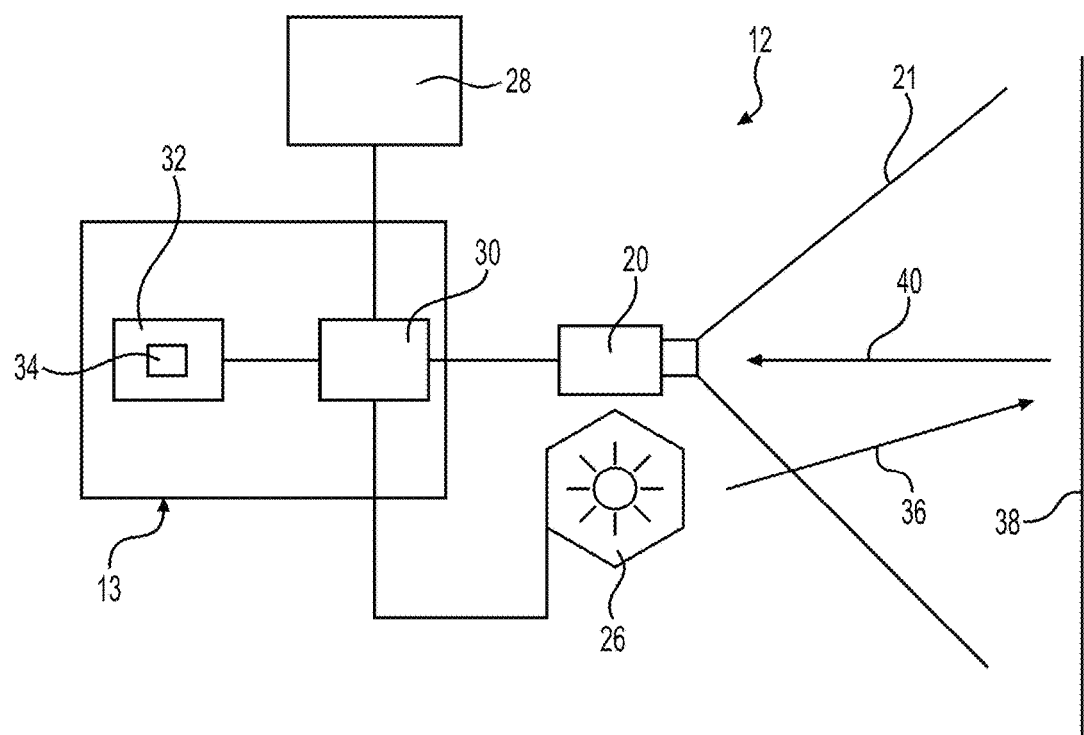
FIG. 3
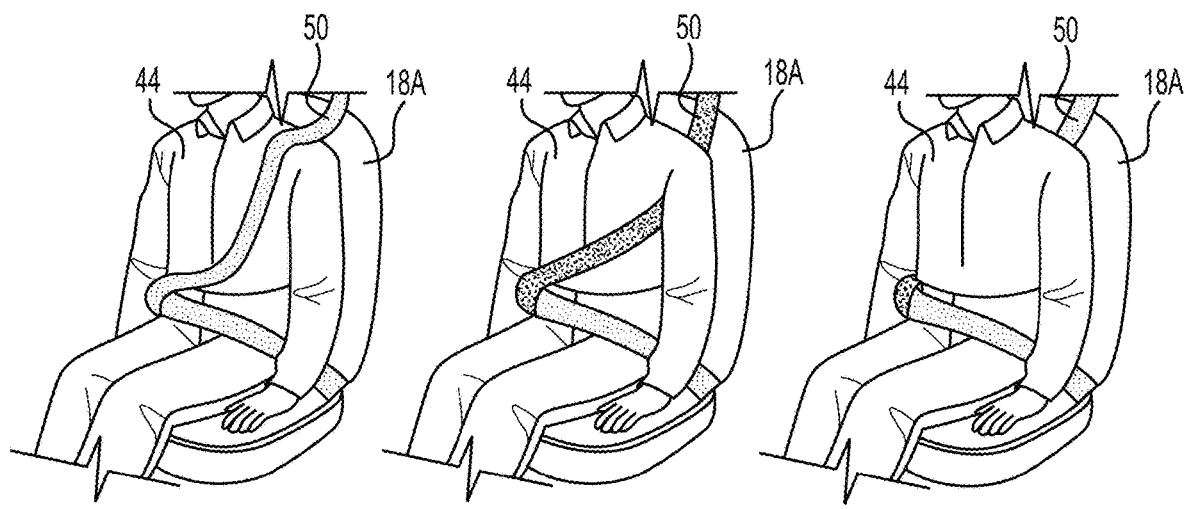
FIG. 4     FIG. 5     FIG. 6

METHOD AND SYSTEM FOR SEATBELT DETECTION USING ADAPTIVE HISTOGRAM NORMALIZATION

BACKGROUND

1. Field of the Invention

The present invention generally relates systems and methods for detecting a seatbelt using a vision system. More specifically, the present invention relates to systems and methods that adjust brightness levels of pixels in an image to improve vision-based detection of the seatbelt.

2. Description of Related Art

Cameras and other image detection devices have been utilized to detect one or more objects. Control systems that are in communication with these cameras can receive images captured by the cameras and process these images. The processing of these images can include detecting one or more objects found in the captured images. Based on these detected objects, the control system may perform some type of action in response to these detected variables.

Conventional systems for detecting seatbelt usage typically rely upon a seatbelt buckle switch. However, those conventional systems are unable to detect if the seatbelt is properly positioned or if the seatbelt buckle is being spoofed. Seat track sensors are typically used to determine distance to an occupant of a motor vehicle. However, such use of seat track sensors do not account for body position of the occupant relative to the seat.

Vision-based systems may use a camera to detect a seatbelt or another object. However, such vision-based systems may have difficulty detecting a pattern of the seatbelt, especially in relatively high brightness or relatively low brightness conditions and where the camera produces a source image with a relatively narrow range of brightness values, particularly in a region of interest for the seatbelt.

SUMMARY

A method for detecting seatbelt positioning is provided. The method comprises: capturing, by a camera, a source image of an occupant, the source image including a plurality of pixels each having a corresponding brightness level; determining a range of brightness levels of a group of the plurality of pixels located within at least one region of the source image; generating an adjusted image by adjusting the corresponding brightness levels of the group of the plurality of pixels located within the at least one region of the source image based on the range of the brightness levels of the group of the plurality of pixels located within the at least one region of the source image; converting the adjusted image to a black-and-white image; and scanning across the black-and-white image to detect a plurality of transitions between black and white segments corresponding to a predetermined pattern of the seatbelt, and using detections of the plurality of transitions to indicate a detection of the seatbelt.

A system for detecting seatbelt positioning is also provided. The system comprises: a seatbelt having a predetermined pattern; a camera configured to capture a source image of an occupant wearing the seatbelt; a processor in communication with the camera; and a controller in communication with the camera. The controller is configured to: determine a range of brightness levels of a group of the plurality of pixels located within at least one region of the source image; generate an adjusted image by adjusting the corresponding brightness levels of the group of the plurality of pixels located within the at least one region of the source image based on the range of the brightness levels of the group of the plurality of pixels located within the at least one region of the source image; convert the adjusted image to a black-and-white image; and determine a position of the seatbelt based on detecting transitions in the black-and-white image corresponding to the predetermined pattern of the seatbelt.

Further objects, features, and advantages of this invention will become readily apparent to persons skilled in the art after a review of the following description, with reference to the drawings and claims that are appended to and form a part of this specification.

BRIEF DESCRIPTION OF THE DRAWINGS

FIG. 3 illustrates a block diagram of the system for detecting proper seatbelt usage and for detecting distance to the seatbelt;

FIG. 4 illustrates a first example of improper seatbelt positioning;

FIG. 5 illustrates a second example of improper seatbelt positioning;

FIG. 6 illustrates a third example of improper seatbelt positioning;

DETAILED DESCRIPTION

Figure 1:
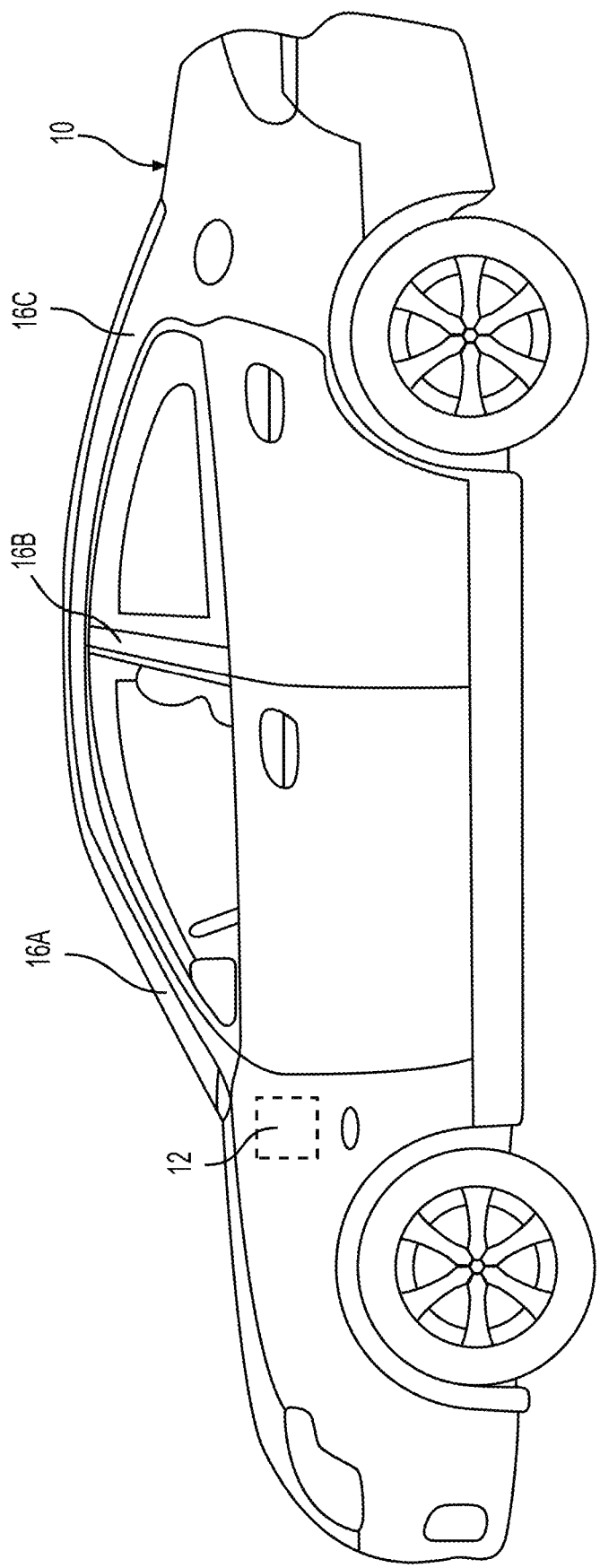
FIG. 1 illustrates a vehicle having a system for detecting proper seatbelt usage and for detecting distance to the seatbelt.

Referring to FIG. 1, illustrated is a vehicle 10 having a seatbelt detection system 12 for detecting proper seatbelt usage and/or for detecting distance to the seatbelt. In this example, the seatbelt detection system 12 has been incorporated within the vehicle 10. However, it should be understood that the seatbelt detection system 12 could be a standalone system separate from the vehicle 10. In some embodiments, the seatbelt detection system 12 may employ some or all components existing in the vehicle 10 for other systems and/or for other purposes, such as for driver monitoring in an advanced driver assistance system (ADAS). Thus, the seatbelt detection system 12 of the present disclosure may be implemented with very low additional costs.

As to the vehicle 10, the vehicle 10 is shown in FIG. 1 as a sedan type automobile. However, it should be understood that the vehicle 10 may be any type of vehicle capable of transporting persons or goods from one location to another. As such, the vehicle 10 could, in addition to being a sedan type automobile, could be a light truck, heavy-duty truck, tractor-trailer, tractor, mining vehicle, and the like. Also, it should be understood that the vehicle 10 is not limited to wheeled vehicles but could also include non-wheeled vehicles, such as aircraft and watercraft. Again, the term vehicle should be broadly understood to include any type of vehicle capable of transporting persons or goods from one location to another and it should not be limited to the specifically enumerated examples above.

Figure 2:
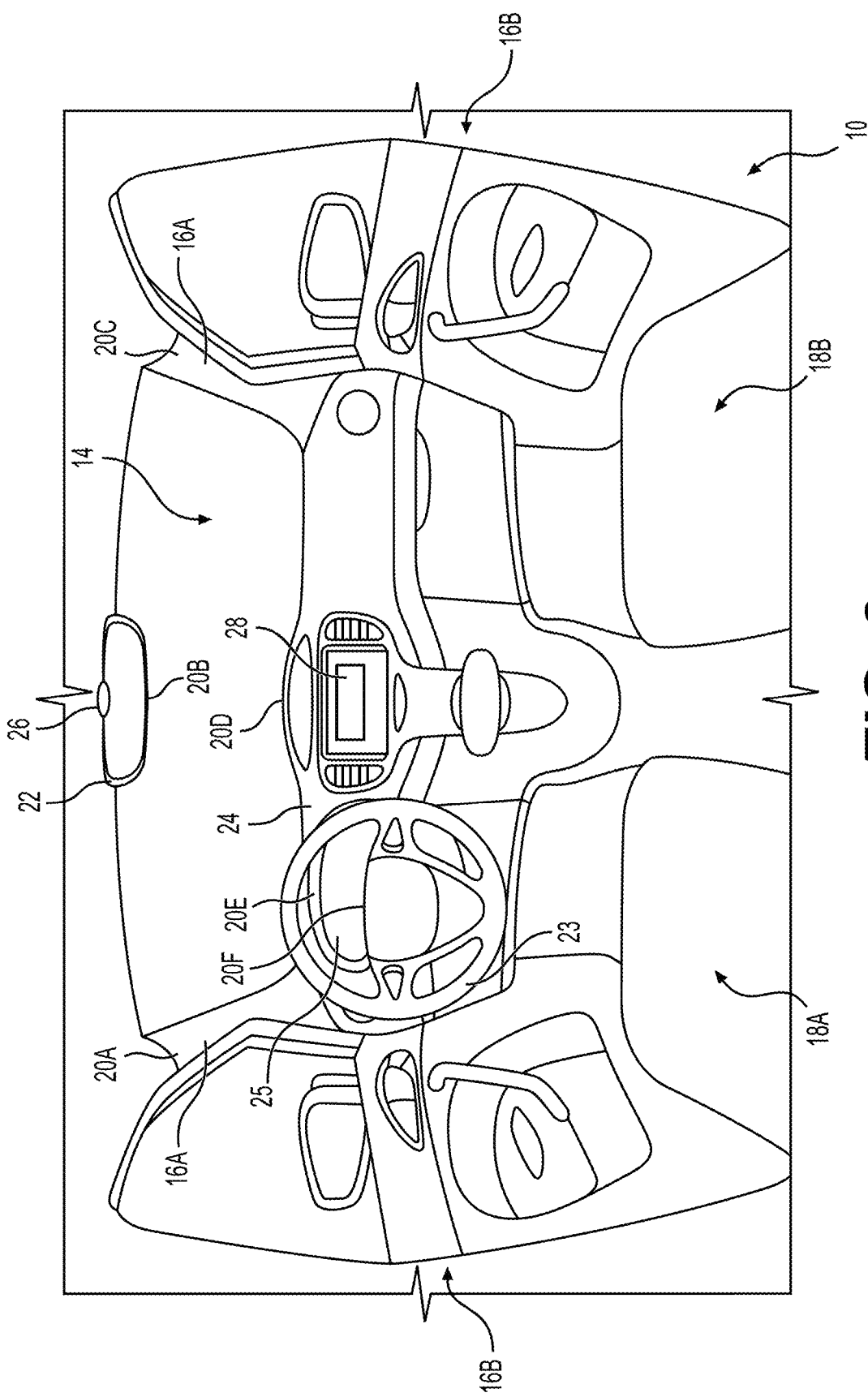
FIG. 2 illustrates a forward looking view of a cabin of the vehicle having a system for detecting proper seatbelt usage and for detecting distance to the seatbelt.

Referring to FIG. 2, a cabin 14 of the vehicle 10 is shown. As it is well understood in the art, the cabin 14 is essentially the interior of the vehicle 10 wherein occupants and/or goods are located when the vehicle is in motion. The cabin 14 of the vehicle may be defined by one or more pillars that structurally define the cabin 14. For example, in FIG. 2, A-pillars 16A and B-pillars 16B are shown. FIG. 1 further illustrates that there may be a third pillar or a C-pillar 16C. Of course, it should be understood that the vehicle 10 may contain any one of a number of pillars so as to define the cabin 14. Additionally, it should be understood that the vehicle 10 may be engineered so as to remove these pillars, essentially creating an open-air cabin 14 such as commonly found in automobiles with convertible tops.

Located within the cabin 14 are seats 18A and 18B. The seats 18A and 18B are such that they are configured so as to support an occupant of the vehicle 10. The vehicle 10 may have any number of seats. Furthermore, it should be understood that the vehicle 10 may not have any seats at all.

The vehicle 10 may have one or more cameras 20A-20F located and mounted to the vehicle 10 so as to be able to have a field a view of at least a portion of the cabin 14 that function as part of a vision system. As such, the cameras 20A-20F may have a field of view of the occupants seated in the seats 18A and/or 18B. Here, cameras 20A and 20C are located on the A-pillars 16A. Camera 20B is located on a rearview mirror 22. Camera 20D may be located on a dashboard 24 of the vehicle 10. Camera 20E and 20F may focus on the driver and/or occupant and may be located adjacent to the vehicle cluster 25 or a steering wheel 23, respectively. Of course, it should be understood that any one of a number of different cameras may be utilized. As such, it should be understood that only one camera may be utilized or numerous cameras may be utilized. Furthermore, the cameras 20A-20F may be located and mounted to the vehicle 10 anywhere so long as to have a view of at least a portion of the cabin 14.

The cameras 20A-20F may be any type of camera capable of capturing visual information. This visual information may be information within the visible spectrum, but could also be information outside of the visible spectrum, such as infrared or ultraviolet light. Here, the cameras 20A-20F are near infrared (NIR) cameras capable of capturing images generated by the reflection of near infrared light. Near infrared light may include any light in the near-infrared region of the electromagnetic spectrum (from 780 nm to 2500 nm). However, the seatbelt detection system 12 of the present disclosure may be configured to use a specific wavelength or range of wavelengths within the near-infrared region.

The source of this near-infrared light could be a natural source, such as the sun, but could also be an artificial source such as a near-infrared light source 26. The near-infrared light source 26 may be mounted anywhere within the cabin 14 of the vehicle 10 so as long as to be able to project near-infrared light into at least a portion of the cabin 14. Here, the near-infrared light source 26 is mounted to the rearview mirror 22 but should be understood that the near-infrared light source 26 may be mounted anywhere within the cabin 14. Additionally, it should be understood that while only one near-infrared light source 26 is shown, there may be more than one near-infrared light source 26 located within the cabin 14 of the vehicle 10.

Also located within the cabin 14 may be an output device 28 for relaying information to one or more occupants located within the cabin 14. Here, the output device 28 is shown in a display device so as to convey visual information to one or more occupants located within the cabin 14. However, it should be understood that the output device 28 could be any output device capable of providing information to one or more occupants located within the cabin 14. As such, for example, the output device may be an audio output device that provides audio information to one or more occupants located within the cabin 14 of a vehicle 10. Additionally, should be understood that the output device 28 could be a vehicle subsystem that controls the functionality of the vehicle.

Referring to FIG. 3, a more detailed illustration of the seatbelt detection system 12 is shown. Here, the system 12 includes a control system 13 having a processor 30 in communication with a memory 32 that contains instructions 34 for executing any one of a number of different methods disclosed in this specification. The processor 30 may include a single stand-alone processor or it may include two or more processors, which may be distributed across multiple systems working together. The memory 32 may be any type of memory capable of storing digital information. For example, the memory may be solid-state memory, magnetic memory, optical memory, and the like. Additionally, it should be understood that the memory 32 may be incorporated within the processor 30 or may be separate from the processor 30 as shown.

The processor 30 may also be in communication with a camera 20. The camera 20 may be the same as cameras 20A-20F shown and described in FIG. 2. The camera 20, like the cameras 20A-20F in FIG. 2, may be a near-infrared camera. The camera 20 may include multiple physical devices, such as cameras 20A-20F illustrated in FIG. 2. The camera 20 has a field of view 21.

The near-infrared light source 26 may also be in communication with the processor 30. When activated by the processor 30, the near-infrared light source 26 projects near-infrared light 36 to an object 38 which may either absorb or reflect near-infrared light 40 towards the camera 20 wherein the camera can capture images illustrating the absorbed or reflected near-infrared light 40. These images may then be provided to the processor 30.

The processor 30 may also be in communication with the output device 28. The output device 28 may include a visual and/or audible output device capable of providing information to one or more occupants located within the cabin 14 of FIG. 2. Additionally, it should be understood that the output device 28 could be a vehicle system, such as a safety system that may take certain actions based on input received from the processor 30. For example, the processor 30 may instruct the output device 28 to limit or minimize the functions of the vehicle 10 of FIG. 1. As will be explained later in this specification, one of the functions that the seatbelt detection system 12 may perform is detecting if an occupant is properly wearing a safety belt. If the safety belt is not properly worn, the processor 30 could instruct the output device 28 to limit the functionality of the vehicle 10, such that the vehicle 10 can only travel at a greatly reduced speed.

FIG. 4 illustrates a first example of improper seatbelt positioning, showing a seatbelt 50 that is ill-adjusted on an occupant 44 sitting on a seat 18A of the vehicle 10. The ill-adjusted seatbelt 50 in this example, drapes loosely over the shoulder of the occupant 44. FIG. 5 illustrates a second example of improper seatbelt positioning, showing the seatbelt 50 passing under the armpit of the occupant 44. FIG. 6 illustrates a third example of improper seatbelt positioning, showing the seatbelt 50 passing behind the back of the occupant 44. The seatbelt detection system may detect other examples of improper seatbelt positioning, such as a seatbelt that is missing or which is not worn by the occupant 44, even in cases where the buckle is spoofed (e.g. by plugging-in the buckle with the seatbelt behind the occupant 44 or by placing a foreign object into the buckle latch).

Figure 7A:
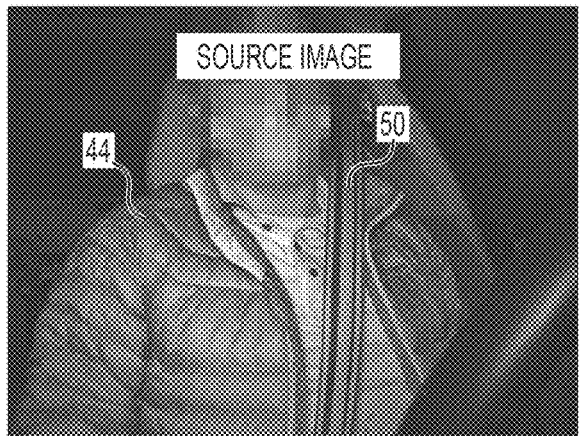
FIG. 7A shows a near infrared (NIR) image of a person wearing a seatbelt in accordance with an aspect of the present disclosure.
Figure 7B:
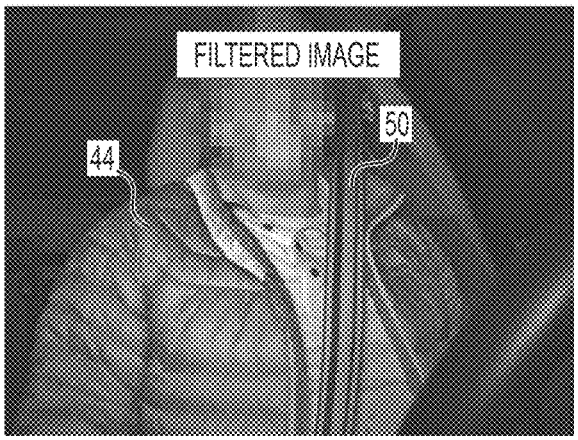
FIG. 7B shows a filtered image based on the NIR image of FIG. 7A, in accordance with the present disclosure.
Figure 7C:
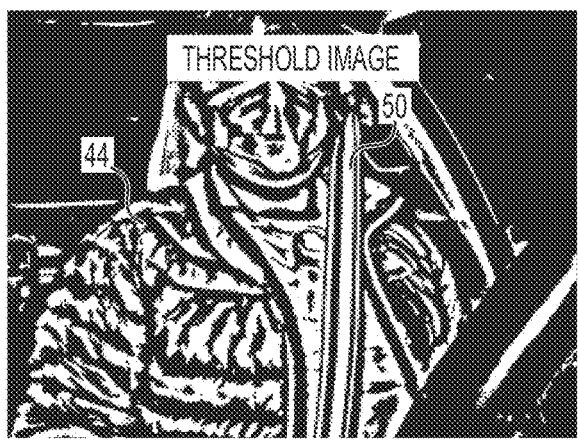
FIG. 7C shows a Black/White image based on the NIR image of FIG. 7A, in accordance with the present disclosure.
Figure 7D:
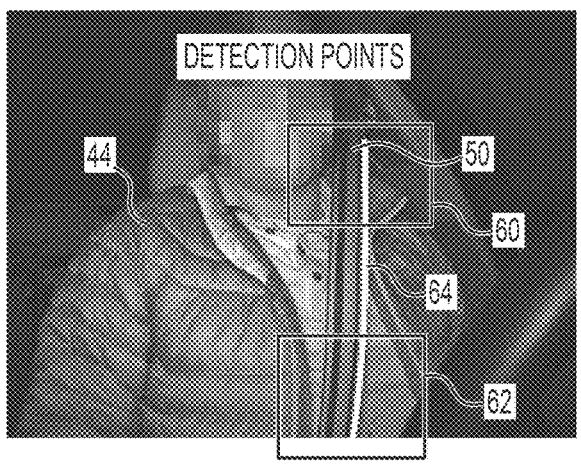
FIG. 7D shows an image based on the NIR image of FIG. 7A, illustrating detection points, in accordance with the present disclosure.

FIG. 7A shows a near infrared (NIR) image of an occupant 44 wearing a seatbelt 50 in accordance with an aspect of the present disclosure. This may represent an image captured by the camera 20 and received by the processor 30. In some embodiments, the occupant 44 may be a driver of the vehicle 10. However, the occupant 44 could also be a passenger in the vehicle 10. FIG. 7B shows a filtered image based on the NIR image of FIG. 7A; FIG. 7C shows a Black/White image based on the NIR image of FIG. 7A; and FIG. 7D shows an image based on the NIR image of FIG. 7A, illustrating detection points, in accordance with the present disclosure. Specifically, FIG. 7D shows the seatbelt 50 passing through each of a first region of interest (ROI) 60 and a second ROI 62. The first ROI 60 may be located above a shoulder of the occupant 44, and the second ROI 62 may be located below and to the left of the first ROI. The second ROI 62 may correspond to a central region of the occupant's 44 torso. The ROIs 60, 62 may each have a fixed location within the field of view 21 of the camera 20. Alternatively, the system 12 may adjust the positions of one or both of the ROIs 60, 62 based on a detected location of the occupant 44 within the field of view 21 of the camera 20.

Figure 8A:
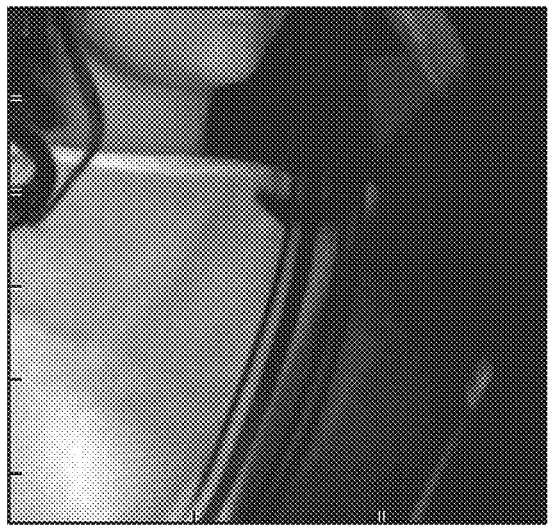
FIG. 8A shows an enlarged section of an unmodified NIR image.
Figure 8B:
FIG. 8B shows a black-and-white image based on the enlarged section of FIG. 8A.

FIG. 8A shows an enlarged section of an unmodified NIR image. This unmodified image is a grayscale image comprising an array of pixels. Each of the pixels has a brightness value represented as an 8-bit number. The brightness of each pixel can be represented by any numeric value from 0 to 255, with 0 representing a black pixel, and 255 representing a white pixel. FIG. 8B shows a black-and-white image based on the enlarged section of FIG. 8A. The black-and-white image includes an array of pixels, each of which is either black or white. The color of each of the pixels in the black-and-white image is determined by comparing a corresponding pixel in the grayscale image of FIG. 8A to a threshold value. Each pixel in the black-and-white image may be set as white in response to the corresponding pixel in the grayscale image having a brightness value that is greater than the threshold value, or else it may be set to black. In the example shown in FIGS. 8A-8B, the threshold value is 60. However, the threshold value may be any value, which may be predetermined and/or dynamically adjusted. The threshold value may be adjusted to cause a given percentage of the pixels in the black-and-white to be white. For example, the threshold value may be adjusted until at least half of the pixels are white.

Figure 8C:
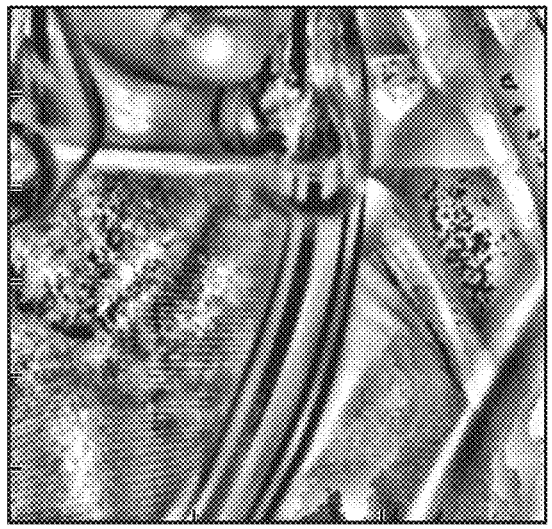
FIG. 8C shows an enlarged section of an adjusted NIR image formed in accordance with a method of the present disclosure.
Figure 8D:
FIG. 8D shows a black-and-white image based on the enlarged section of FIG. 8C.

FIG. 8C shows an enlarged section of an adjusted NIR image formed in accordance with a method of the present disclosure, and FIG. 8D shows a black-and-white image based on the enlarged section of FIG. 8C and with a threshold value of 105. More specifically, FIG. 8C shows the adjusted image, in which each of the pixels have grayscale values that are adjusted or normalized based on brightness values of all of the pixels within a region around each of the pixels. The region may also be called a window, and the window may have any size or shape. In the example shown in FIG. 8C, the region has a circular size with a 50-pixel radius. In some embodiments, one or more dimensions of the region may be determined based on a size of an object to be detected. For example, the 50-pixel dimension for the radius may be chosen to cause an area that is equal to or slightly larger than an expected width of the seatbelt within the image.

Adjusting or normalizing the brightness values of the pixels in the source image results in an adjusted image with increased dynamic range. This adjusted image may allow for a corresponding black-and-white image to be formed and which includes additional details or features that are not otherwise visible. An example of these additional details are the stripes of the seatbelt that are visible in the black-and-white image of FIG. 8D, and which are not visible in the black-and-white image of FIG. 8B.

Figure 9B:
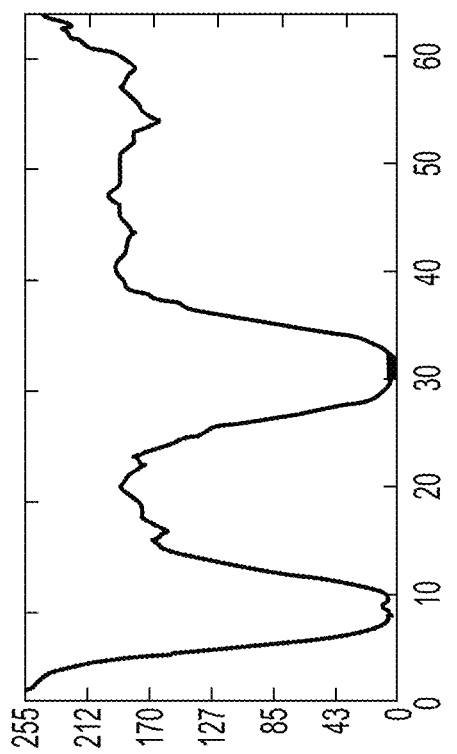
FIG. 9B shows a graph of brightness values of pixels along a row of an adjusted image.
Figure 9A:
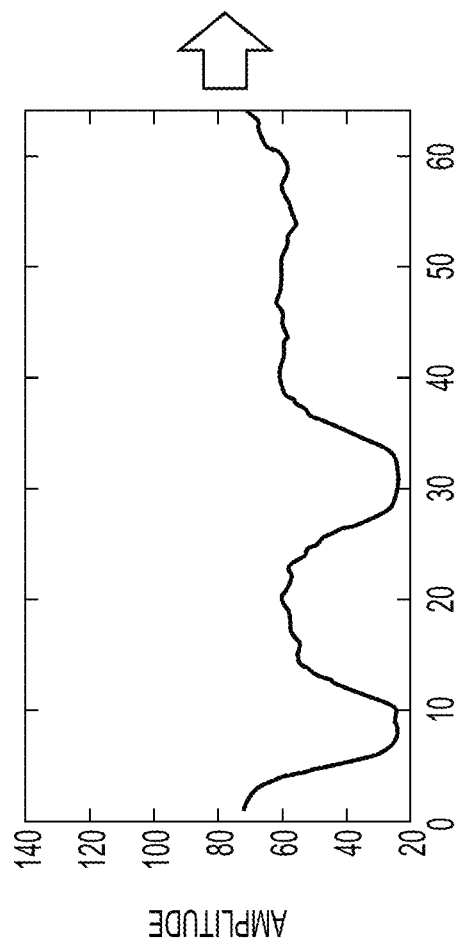
FIG. 9A shows a graph of brightness values of pixels along a row of a source image.
Figure 10:
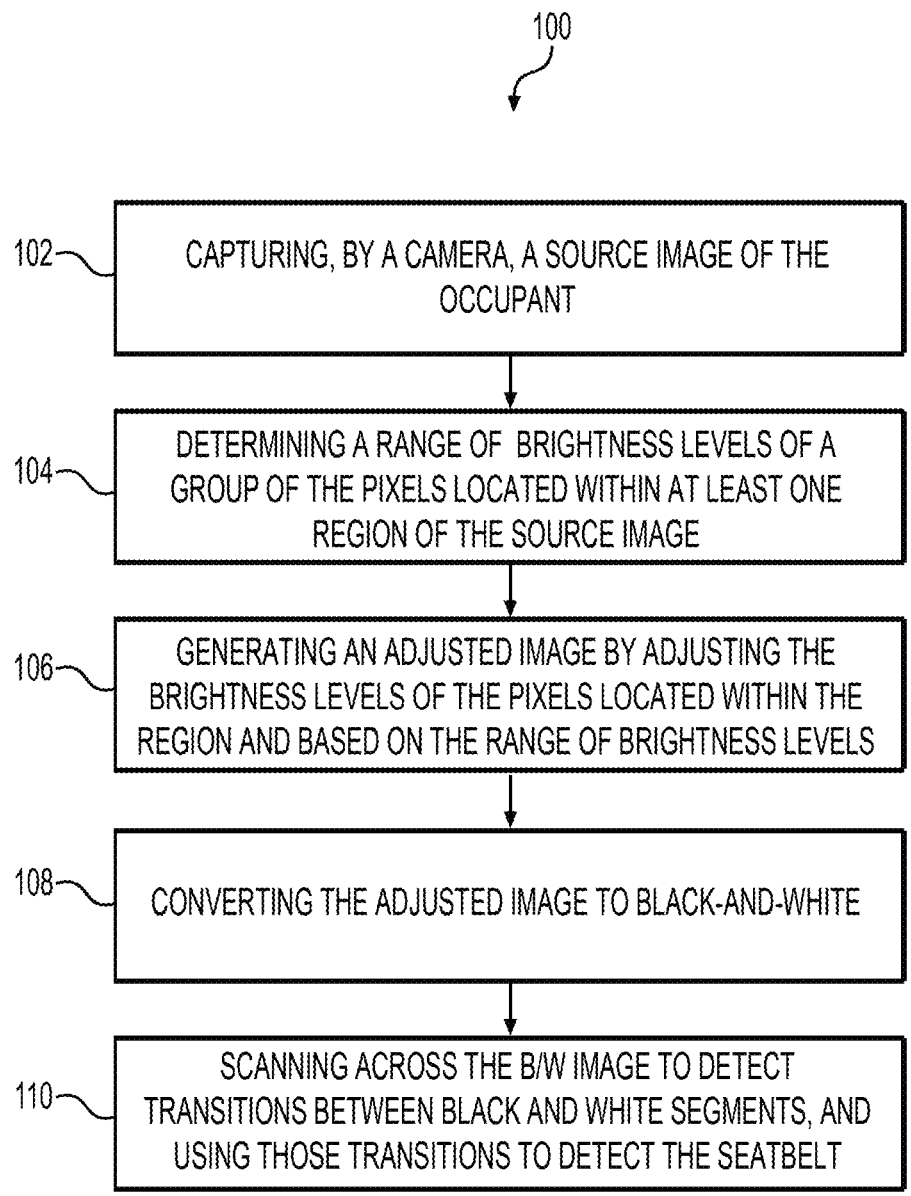
FIG. 10 shows a flowchart listing steps in a method for detecting seatbelt positioning.

FIG. 9A shows a graph of brightness values of pixels along a row of a source image. FIG. 9B shows a graph of brightness values of pixels along a row of an adjusted image and based on the source image of FIG. 9A. A brightness value may also be called an amplitude of the grayscale value. As shown in FIG. 9A, the pixels have brightness values of approximately 25 to 75 on the scale from 0-255. This corresponds to a range of 50 (i.e. the difference between the brightest and the darkest pixel in the row.) The brightness values of the pixels in the adjusted image are scaled and offset to change the range of the pixels in a given region to have the full range of brightness values between 0 and 255. For example, the darkest pixel in the source image of FIG. 9A is offset to A method 100 of detecting seatbelt positioning is shown in the flow chart of FIG. 10. The method 100 includes capturing, by a camera, a source image of the occupant at step 102. The source image comprises a plurality of pixels each having a corresponding brightness level. Step 102 may include capturing the source image in the near infrared (NIR) spectrum, which may include detecting reflected NIR light provided by a near-infrared light source 26. However, other types or wavelengths of light may be used. For example, the second method 100 may use one or more colors of visible or invisible light. Step 102 may further include transmitting the source image, as a video stream or as one or more still images, from the camera 20 to a control system 13 having a processor 30 for additional processing.

The method 100 also includes determining a range of brightness levels of a group of the plurality of pixels located within at least one region of the source image at step 104. The processor 30 may perform step 104, which may include storing a highest brightness value and a lowest brightness value of all of the pixels within the at least one region. In some embodiments, step 104 may include some filtering or other processing to ignore pixels with brightness values that are outliers, such as a small number of pixels having a full-scale brightness value, also called hot pixels, and/or a small number of pixels having a brightness value of zero, also called dead pixels. Such hot pixels and/or dead pixels may result, for example, from defects in an image sensor or other hardware used to form the source image.

The method 100 also includes generating an adjusted image by adjusting the brightness levels of the group of the pixels located within the at least one region of the source image and based on the range of the brightness levels at step 106. The processor 30 may perform step 106, which may include calculating a brightness value of each pixel in the region of the adjusted image based on brightness value of a corresponding source pixel in the source image. In some embodiments, step 106 includes offsetting the brightness level of each of the pixels based on a low brightness value, the low brightness value based on the brightness levels of the pixels within the region in the source image.

In some embodiments, step 106 includes multiplying the brightness level of each of the pixels by a scale factor, the scale factor based on the range of the brightness levels of the pixels within the region. For example, the processor may calculate brightness values for each of a plurality of pixels in the adjusted image by offsetting (e.g. subtracting an offset value) and scaling (e.g. multiplying by a scale factor) a brightness value of a corresponding source pixel. The method may include determining each of the scale factor and the offset value based on the range of the brightness levels determined at step 106.

In some embodiments, the scale factor is based on a difference between a low brightness value and a high brightness value, with each of the low brightness value and the high brightness value based on the brightness levels of the pixels within the region.

In some embodiments, the low brightness value is greater than a lowest brightness level of the pixels within the region. The low brightness value may be a brightness value based on the brightness of a pixel in the region at a first given percentile. For example, the low brightness value may be a brightness value of a pixel at a 5% percentile value, wherein 5% of the pixels in the region are brighter than the low brightness value. Such an arrangement may prevent a few dead pixels (up to 5% of all of the pixels in any region) from adversely affecting the scale factor. The first percentile value may have another value, such as 0.5%, 1%, 2%, 3%, 4%, etc.

In some embodiments, the high brightness value is lower than a highest brightness level of the pixels within the region. The high brightness value may be a brightness value based on the brightness of a pixel in the region at a second given percentile. For example, the high brightness value may be a brightness value of a pixel at a 95% percentile value, wherein 95% of the pixels in the region are less bright than the high brightness value. Such an arrangement may prevent a hot dead pixels (up to 5% of all of the pixels in any region) from adversely affecting the scale factor. The second percentile value may have another value, such as 99.5%, 99%, 98%, 97%, 96%, etc.

In some embodiments, the at least one region includes a plurality of regions, and the adjusted image includes the plurality of regions each adjusted independently. For example, step 106 may include sequentially adjusting each of the plurality of regions of the source image to generate the adjusted image. In some embodiments, the region of the source image has at least one dimension approximately equal to a width of the seatbelt in the source image.

The method 100 also includes converting the adjusted image to black-and-white (B/W) at step 108. The terms black and white may include any representations of pixels in one of two binary states representing dark or light. The processor 30 may perform step 108, which may include using a localized binary threshold to determine whether any given pixel in the B/W image should be black or white. Such a localized binary threshold may compare a source pixel in the adjusted image to nearby pixels within a predetermined distance of the pixel. If the source pixel is brighter than an average of the nearby pixels, the corresponding pixel in the B/W image may be set to white, and if the source pixel is less bright than the average of the nearby pixels, then the corresponding pixel in the B/W image may be set to black. In some embodiments, the predetermined distance may be about 100 pixels. In some embodiments, the predetermined distance may be equal to or approximately equal to a pixel width of the seatbelt 50 with the seatbelt 50 at a nominal position relative to the camera (e.g. in use on an occupant 44 having a medium build and sitting in the seat 18a in an intermediate position.

The method 100 also includes scanning across the black-and-white image to detect a plurality of transitions between black and white segments corresponding to a predetermined pattern of the seatbelt, and using detections of those transitions to indicate a detection of the seatbelt at step 110. The processor 30 may perform step 110, which may include comparing the relative distances between the transitions to determine if those relative distances correlate to a ratio of the widths of stripes of the seatbelt 50, and where they do, marking that location as a detection 64. For example, the processor 30 may be programmed to scan across horizontal lines in the B/W image to detect groupings of transitions spaced apart by distances that match a given ratio of widths of the stripes.

If a determination is made that the occupant 44 is properly wearing the seatbelt 50, the seatbelt detection system 12 can allow the vehicle 10 to operate in a normal mode. However, if the seatbelt detection system 12 indicates that the occupant 44 is not properly wearing the seatbelt 50, the control system 12 could take any one of a number of different actions. For example, the seatbelt detection system 12 could indicate to the occupant 44 using the output device 28 so as to provide a visual and/or audible cue that the seatbelt 50 is not being properly worn. Additionally, the output device 28 could be in communication with any one of a number of different vehicle systems so as to restrict the operation of the vehicle 10 until the seatbelt 50 is being properly worn by the occupant 44.

The seatbelt detection system 12 may also be in communication with other control systems so as to improve the reliability of the system. For example, the seatbelt detection system 12 may also be in communication with one or more sensors, such as the sensors that detect the safety belt latch 61 or tongue is inserted into the safety belt buckle 63. If the seatbelt detection system 12 determines that the safety belt buckle is properly latched and determines that the seatbelt 50 is properly positioned across the body 48 of the occupant 44, the seatbelt detection system 12 can, with more confidence, determine that the seatbelt 50 is being properly utilized by the occupant 44.

In some embodiments, dedicated hardware implementations, such as application specific integrated circuits, programmable logic arrays, and other hardware devices, can be constructed to implement one or more steps of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A method for detecting seatbelt positioning, comprising:
   capturing, by a camera, a source image of an occupant, the source image including a plurality of pixels each having a corresponding brightness level;
   determining a range of brightness levels of a group of the plurality of pixels located within at least one region of the source image;
   generating an adjusted image by adjusting the corresponding brightness levels of the group of the plurality of pixels located within the at least one region of the source image based on the range of the brightness levels of the group of the plurality of pixels located within the at least one region of the source image;
   converting the adjusted image to a black-and-white image; and
   scanning across the black-and-white image to detect a plurality of transitions between black and white segments corresponding to a predetermined pattern of the seatbelt, and using detections of the plurality of transitions to indicate a detection of the seatbelt.

2. The method of claim 1, wherein the at least one region includes a plurality of regions, and wherein the adjusted image includes the plurality of regions each adjusted independently.

3. The method of claim 1, wherein capturing the source image of the occupant includes capturing the source image in near infrared (NIR).

4. The method of claim 1, wherein the region of the source image has at least one dimension approximately equal to a width of the seatbelt in the source image.

5. The method of claim 1, wherein converting the adjusted image to the black-and-white image includes comparing the brightness level of each of the pixels with a threshold value.

6. The method of claim 1, wherein adjusting the brightness levels of the pixels within the region comprises multiplying the brightness level of each of the pixels by a scale factor, the scale factor based on the range of the brightness levels of the pixels within the region.

7. The method of claim 6, wherein the scale factor is based on a difference between a low brightness value and a high brightness value, with each of the low brightness value and the high brightness value based on the brightness levels of the pixels within the region.

8. The method of claim 7, wherein the low brightness value is greater than a lowest brightness level of the pixels within the region.

9. The method of claim 7, wherein the high brightness value is lower than a highest brightness level of the pixels within the region.

10. The method of claim 1, wherein adjusting the brightness levels of the pixels within the region includes offsetting the brightness level of each of the pixels based on a low brightness value, the low brightness value based on the brightness levels of the pixels within the region.

11. A system for detecting seatbelt positioning, comprising:
    a seatbelt having a predetermined pattern;
    a camera configured to capture a source image of an occupant wearing the seatbelt, the source image including a plurality of pixels each having a corresponding brightness level;
    a processor in communication with the camera; and
    a controller in communication with the camera and configured to:
      determine a range of brightness levels of a group of the plurality of pixels located within at least one region of the source image;
      generate an adjusted image by adjusting the corresponding brightness levels of the group of the plurality of pixels located within the at least one region of the source image based on the range of the brightness levels of the group of the plurality of pixels located within the at least one region of the source image;
      convert the adjusted image to a black-and-white image; and
      determine a position of the seatbelt based on detecting transitions in the black-and-white image corresponding to the predetermined pattern of the seatbelt.

12. The system of claim 11, wherein the at least one region includes a plurality of regions, and wherein the adjusted image includes the plurality of regions each adjusted independently.

13. The system of claim 11, wherein capturing the source image of the occupant includes capturing the source image in near infrared (NIR).

14. The system of claim 11, wherein the region of the source image has at least one dimension approximately equal to a width of the seatbelt in the source image.

15. The system of claim 11, wherein converting the adjusted image to the black-and-white image includes the controller comparing the brightness level of each of the pixels with a threshold value.

16. The system of claim 11, wherein adjusting the brightness levels of the pixels within the region includes the controller multiplying the brightness level of each of the pixels by a scale factor, the scale factor based on the range of the brightness levels of the pixels within the region.

17. The system of claim 16, wherein the scale factor is based on a difference between a low brightness value and a high brightness value, with each of the low brightness value and the high brightness value based on the brightness levels of the pixels within the region.

18. The system of claim 17, wherein the low brightness value is greater than a lowest brightness level of the pixels within the region.

19. The system of claim 17, wherein the high brightness value is lower than a highest brightness level of the pixels within the region.

20. The system of claim 11, wherein adjusting the brightness levels of the pixels within the region includes the controller offsetting the brightness level of each of the pixels based on a low brightness value, the low brightness value based on the brightness levels of the pixels within the region.

* * * * *